United States Patent
Koskinen et al.

(10) Patent No.: US 9,220,041 B2
(45) Date of Patent: Dec. 22, 2015

(54) MOBILITY ENHANCEMENT FOR FAST MOVING USER EQUIPMENT IN A HETEROGENOUS NETWORK ENVIRONMENT

(75) Inventors: Jussi-Pekka Koskinen, Oulu (FI); Jarkko Koskela, Oulu (FI); Lars Dalsgaard, Oulu (FI); Sari Nielsen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 13/249,989

(22) Filed: Sep. 30, 2011

(65) Prior Publication Data

US 2013/0084849 A1    Apr. 4, 2013

(51) Int. Cl.
*H04W 24/00* (2009.01)
*H04W 36/00* (2009.01)
H04W 36/32 (2009.01)
H04W 48/20 (2009.01)
H04W 84/04 (2009.01)

(52) U.S. Cl.
CPC .......... *H04W 36/0088* (2013.01); *H04W 36/32* (2013.01); *H04W 48/20* (2013.01); *H04W 84/045* (2013.01)

(58) Field of Classification Search
CPC .................................................. H04W 24/00
USPC ............ 455/422.1, 434, 513, 436, 435.1, 441
See application file for complete search history.

(56) References Cited

U.S. PATENT DOCUMENTS

| | | | |
|---|---|---|---|
| 5,794,146 A | 8/1998 | Sevcik et al. | 455/434 |
| 6,385,460 B1 | 5/2002 | Wan | 455/515 |
| 7,408,506 B2 | 8/2008 | Miller | 342/357.17 |
| 7,822,436 B2 | 10/2010 | Bitran et al. | 455/550.1 |

(Continued)

FOREIGN PATENT DOCUMENTS

| | | |
|---|---|---|
| EP | 2355582 A1 | 8/2011 |
| WO | WO 99/62285 | 12/1999 |

(Continued)

OTHER PUBLICATIONS

3GPP TSG-RAN WG2 #74; R2-113302; Barcelona, Spain, May 9-14, 2011; Agenda item: 7.6 Source: LG Electronics Inc.; Title: *Mobility state detection enhancement for HetNet* (2 pages).

(Continued)

*Primary Examiner* — Michael T Vu
(74) *Attorney, Agent, or Firm* — Harrington & Smith (57) ABSTRACT

Relative sizes of neighbor cells are identified, and measurement reporting of the neighbor cells is differentiated in dependence on at least the relative size. In one embodiment the relative sizes are identified by a frequency layer and/or physical cell identity sent by a serving cell. The differentiated reporting may be implemented by using different values, based on the relative sizes, of a measurement or reporting parameter or a scaling factor (such as $T_{reselection}$ or time to trigger) which adjusts either of those parameters. In one embodiment the differentiated measurement reporting is conditional on a user equipment which sends the measurement reports being classified as fast moving, and in another is further conditional on it also having no active data transfer applications ongoing. In various embodiments, detecting and measuring of small neighbor cells (and thus their reporting) is omitted, or measurements can be collected normally and only the reporting is omitted.

21 Claims, 4 Drawing Sheets

(56) References Cited

U.S. PATENT DOCUMENTS

| | | | |
|---|---|---|---|
| 7,920,838 B2 | 4/2011 | Doradla et al. | 455/161.1 |
| 7,965,672 B2* | 6/2011 | Kim | 370/327 |
| 8,165,583 B2 | 4/2012 | Parron et al. | 455/435.2 |
| 8,270,975 B2* | 9/2012 | Kim et al. | 455/436 |
| 2002/0147024 A1 | 10/2002 | Wan | 455/515 |
| 2006/0119508 A1 | 6/2006 | Miller | 342/357.17 |
| 2007/0184835 A1 | 8/2007 | Bitran et al. | 455/434 |
| 2009/0061877 A1 | 3/2009 | Gallagher et al. | 455/436 |
| 2009/0296652 A1 | 12/2009 | Rudowicz et al. | 370/331 |
| 2010/0008323 A1* | 1/2010 | Deshpande et al. | 370/331 |
| 2010/0113036 A1* | 5/2010 | Cho et al. | 455/444 |
| 2010/0151857 A1 | 6/2010 | Brisebois et al. | 455/434 |
| 2011/0021201 A1 | 1/2011 | Lee et al. | 455/444 |
| 2011/0086635 A1* | 4/2011 | Grob-Lipski | 455/423 |
| 2011/0124334 A1 | 5/2011 | Brisebois et al. | 455/434 |
| 2011/0188472 A1 | 8/2011 | Jeon et al. | 370/331 |
| 2011/0207456 A1* | 8/2011 | Radulescu et al. | 455/434 |
| 2011/0312274 A1 | 12/2011 | Hildebrand et al. | 455/62 |
| 2012/0094664 A1 | 4/2012 | Jung et al. | 455/434 |
| 2012/0115527 A1* | 5/2012 | Narasimha et al. | 455/513 |
| 2013/0072189 A1 | 3/2013 | Cheng et al. | 455/436 |

FOREIGN PATENT DOCUMENTS

| | | |
|---|---|---|
| WO | WO-2008060236 A2 | 5/2008 |
| WO | WO 2009/146349 A1 | 12/2009 |
| WO | WO 2010/151016 A2 | 12/2010 |
| WO | WO-2011123006 A1 | 10/2011 |

OTHER PUBLICATIONS

3GPP TSG WG2 #75, Vodafone, "Improving Mobility Towards Small Cells", R2-114005, (Aug. 22-26, 2011), (pp. 1-5).

3GG TS 36.304 V10.1.0 (Mar. 2011), Technical Specification, 3$^{rd}$ Generation Partnership Project; Technical Specification Group Radio Access Network; Evolved Universal Terrestrial Radio Access (E-UTRA); User Equipment (UE) Procedures in Idle Mode (Release 10); (33 pages).

ITRI; "Discussion on mobility state detection for HetNer"; R2-114219; 3GPP TSG-RAN WG2 #75; Aug. 22-26, 2011; Athens, Greece; pp. 1-3.

3GPP TSG RAN WG2 #75, Athens, Greece, Aug. 22-26, 2011, R2-114005, "Improving Mobility Towards Small Cells", Vodafone, 5 pgs.

3GPP TSG RAN WG2 Meeting #75, Athens, Greece, Aug. 22-26, 2011, R2-114362, "On Network-Assisted Pico Cell Discovery in LTE HetNets", Alcatel-Lucent, Alcatel-Lucent Shanghai Bell, 3 pgs.

* cited by examiner

MOBILITY ENHANCEMENT FOR FAST MOVING USER EQUIPMENT IN A HETEROGENOUS NETWORK ENVIRONMENT

TECHNICAL FIELD

The exemplary and non-limiting embodiments of this invention relate generally to wireless communication systems, methods, devices and computer programs and, more specifically, relate to user equipment mobility and measuring/reporting of neighbor cells.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Figure 1:
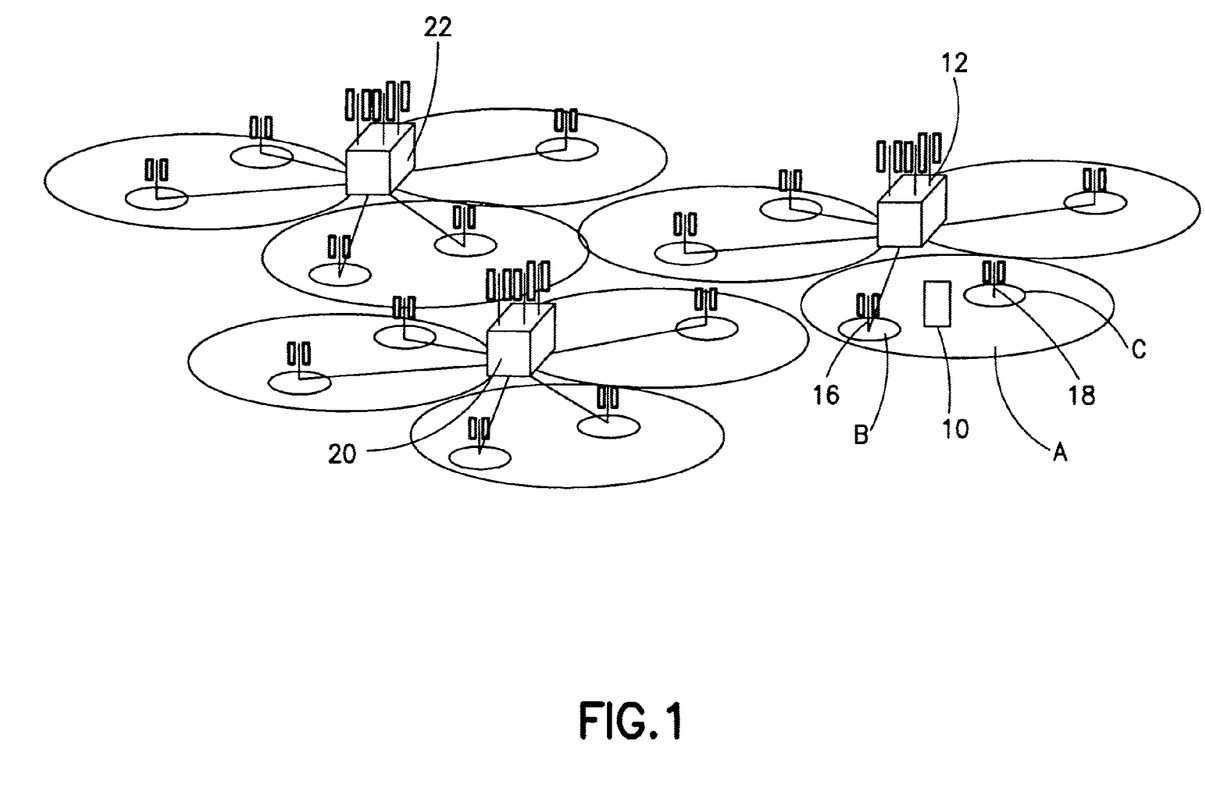
FIG. 1 illustrates a heterogeneous network including macros cells and pico cells with a UE moving amongst them, and is an exemplary radio environment in which embodiments of these teachings may be practiced to advantage.

The following abbreviations that may be found in the specification and/or the drawing figures are defined as follows:

3GPP third generation partnership project
DL downlink (eNB to UE)
eNB EUTRAN Node B (evolved Node B/base station)
E-UTRAN evolved UTRAN (LTE)
LTE long term evolution
PCI physical cell indicator/indication
RF radio frequency
RNC radio network controller (UTRAN)
UE user equipment
UL uplink (UE to eNB)
UTRAN universal terrestrial radio access network Recent progression in the wireless arts include the deployment of smaller cells within the coverage areas (or extending the coverage area) of conventional cells. In at least the LTE system these smaller cells are generally termed pico or nano cells while the conventional cells are distinguished by the term macro cell, with the aggregated deployment referred to as a heterogeneous network or HetNet for short. An exemplary HetNet is shown at FIG. 1, in which there are pico eNBs 16, 18 with control over relatively small cells B, C are within the coverage area of a macro cell A controlled by a macro eNB 12. It is conventional to use the terms cell and eNB or access node interchangeably, so for example the UE 10 with the macro cell 12 as its serving cell will as shown in FIG. 1 see cells 16 and 18 as neighbor cells. In the UTRAN and E-UTRAN the serving cell broadcasts in its system information a neighbor cell list, which its UEs use to know what frequencies and cells to measure and report upon in their scheduled measuring opportunities. These neighbor cell measurement reports aid the serving cell in handling UE mobility.

Current LTE specifications provide for a UE mobility state estimation (MSE) which is based on the number of cell reselections (for a UE in the idle mode) or handovers (for a UE in the connected mode) the UE has undergone over a predefined period of time. This ratio serves as a proxy for the UE's relative speed. For idle mode UEs having medium and high mobility states, the UE will add an offset to the signaled cell reselection margin (the parameter $Q_{hyst}$ which is a hysteresis value) and scales the value for $T_{reselection}$ by a factor. $T_{reselection}$ is a time value signaled also in system information against which a UE will test the received signal strength (or power) of a best neighbor cell against that of its serving cell; if the received signal strength/power from the neighbor cell exceeds that from the serving cell for the duration $T_{reselection}$ the UE is to re-select to that neighbor cell. The connected mode UE will scale its time-to-trigger by a factor. Time to trigger is a time window over which the UE averaged measurements have to fulfill a given event prior to the UE sending a given measurement report for that event (for an event triggered measurement report). These scaling factors are parameters signaled by the network and are used at least in part to optimize mobility for fast moving UEs.

These factors were not designed with HetNets in mind, but rather for the case where the UE in FIG. 1 would see only macro neighbor cells 20, 22; at that time pico neighbor cells 16, 18 were not a part of the radio environment. See for example 3GPP TS 36.304 and 36.331. So the above parameters and procedures for using them intended that the faster moving UEs should hand over faster than slower moving UEs, so as to avoid late handovers and radio link failures due to a long delay by setting those parameters from the baseline of a slow-moving UE). The mobility state estimation noted above can be used for this purpose. But the conventional macro cell processes are not optimized for HetNet deployments as will be detailed below.

What is needed in the art is a way to account for pico cells and similar in a HetNet radio environment when considering UE mobility.

SUMMARY

In accordance with a first aspect of the invention there is an apparatus comprising at least one processor and at least one memory including computer program code. In this first aspect the at least one memory and the computer program code are configured, with the at least one processor, to cause the apparatus at least to: identify relative sizes of neighbor cells; and differentiate measurement reporting of the neighbor cells in dependence on at least the relative size.

In accordance with a second aspect of the invention there is a method comprising: identifying relative sizes of neighbor cells; and differentiating measurement reporting of the neighbor cells in dependence on at least the relative size.

In accordance with a third aspect of the invention there is a computer readable memory storing a program of instructions comprising: code for identifying relative sizes of neighbor cells; and code for differentiating measurement reporting of the neighbor cells in dependence on at least the relative size.

These and other aspects are detailed further below with particularity.

DETAILED DESCRIPTION

Directly extending the conventional macro-designed handover and measurement parameters detailed in the background section above to the HetNet environment of FIG. 1 would not result in an optimal solution. Specifically, it is often not preferred to handover a fast moving UE to a pico cell, because the fast moving UE will traverse the small coverage area of the pico cell in relatively short time requiring still another handover. This would cause an unnecessary signaling load to the network and gaps for any ongoing data transfer. In the idle mode similarly there is an adverse consequence when a fast moving UE reselects to a small pico cell for only a short period of time since this may cause performance reduction in paging reception and mobility, and possibly also loss of service.

According to exemplary embodiments of these teachings the scaling of the mobility-related parameters such as those reviewed in the background section above are limited to only specific cells, namely the larger (macro) cells and the scaling is not used for the small (pico) cells.

This may be implemented in various ways. In one implementation the scaling parameters are not utilized on specific carriers. In a carrier aggregation system the whole system bandwidth is parsed into multiple component carriers, and each UE is assigned one primary carrier termed a PCell and possibly also one or more secondary component carriers termed SCells. In the FIG. 1 environment the macro eNB 12 will operate the PCell at least and any of the pico eNBs 16, 18 will operate one or more of the SCells only, so specifying that scaling factors are not to be used on a SCell is a proxy for specifying the exact pico cell on which those scaling factors will not be utilized. In another implementation the network may specify which exact cells for which the scaling factors are not to be utilized, such as by specifying specific PCIs or a range of PCIs, which further may be restricted to only one or more component carriers. In either case the network may specify the inverse, all cells for which the scaling factors will apply and by extension the UE will know that it shall not apply the scaling factors to all of the cells which are not specified. Either option gives the UE the same information.

In a more particular embodiment, the scaling factors are not suspended for the small cells but are different from the same parameter used for the macro cells. This enables an arrangement in which the scaling for small cells can be in a different direction than for the macro cells, for example for a high mobility UE the time trigger is lengthened for pico cells as compared to macro cells, resulting in neighbor cell measurement reports being triggered less frequently.

Any of the above various embodiments may be realized for the UE's measurements of the pico cells and/or the UE's reporting of its pico cell measurements. For both the case in which the UE measures the pico cell but omits reporting that measurement to its (macro) serving cell due to a different triggering requirement, and the case in which the UE omits the pico cell measurement altogether due to a different measuring requirement, the difference between the neighbor pico cell and the neighbor macro cell from both the UE's and the serving cell's perspective is manifest in the measurement reporting itself. In the former the measurements of the neighbor pico cell are never sent even though they are taken and in the latter there is no measurement report because there is no measurement at all of the neighbor pico cell to report. The measurement reporting itself is what is differentiated as between the smaller pico cells and the larger macro cells. This differential reporting is based on the relative size of the cell, which the network identifies to the UE via the carrier or cell-specific PCI as noted in the above non-limiting examples. There are other factors such as UE mobility state which may manifest a differential reporting of neighbor cells, but these teachings add the relative size of the neighbor cell as a factor on which different reporting of different neighbor cells depends and that relative size is identified to the UE by the network/serving cell.

In a particular deployment there are more relaxed requirements in form of less frequent (or fully omitted) measurements and/or reporting) for fast moving UEs concerning small/pico cells as compared to large/macro cells. There can in such a deployment also be different measurement and/or re-selection configurations toward small/pico cells as compared to large/macro cells for that fast moving UE.

Figure 2:
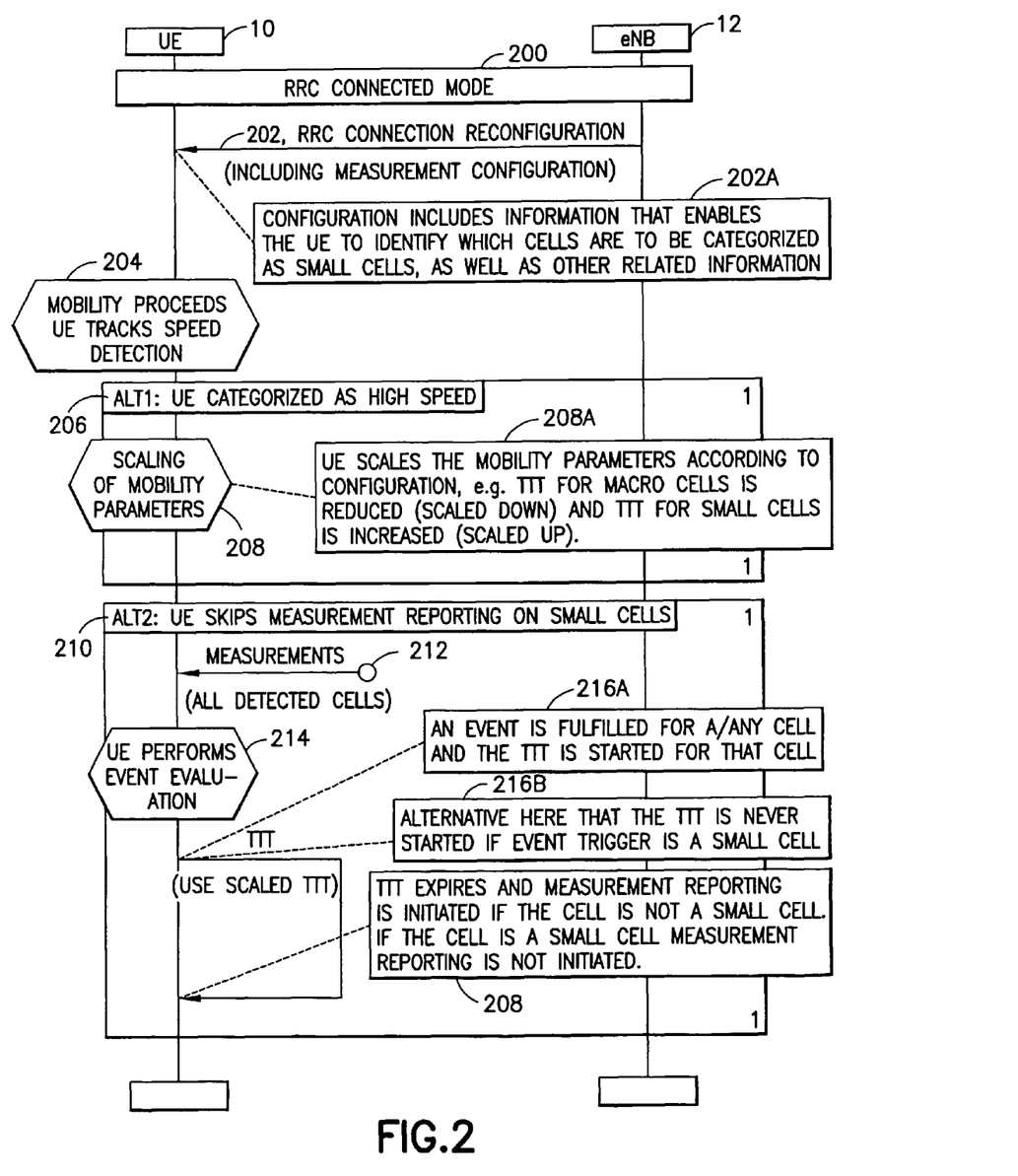
FIG. 2 is a signaling diagram illustrating signaling and actions taken at a user equipment according to two of the exemplary embodiments presented herein.

FIG. 2 is a signaling diagram illustrating two non-limiting implementations of these teachings in the context of the LTE system and a UE 10 in a RRC connected mode 200 with its serving cell eNB 12. In the connected mode the UE 10 will receive a measurement configuration from the network with its RRC Connection Reconfiguration message 202 (or with the RRC Connection Configuration, RRC Configuration Establishment, or RRC Connection Reestablishment message) describing the details of how the UE 10 shall perform measurements and report the results to the eNB 12. In accordance with the FIG. 2 embodiment, the RRC Connection Reconfiguration message 202 is the means by which the network 12 identifies to the UE 10 which cells are to be categorized as small cells 202A. The UE 10 continues to track its mobility state at functional block 204, such as by counting the number of handovers per given time period as noted in the background section above (or number of reselections per time period if the UE is in the idle state). FIG. 2 then illustrates two different embodiments.

In another embodiment the network can identify the small cells via broadcast system information. For example, the network can signal in system information a particular frequency layer or layers on which all the pico cells are deployed, all the cells are pico cells (e.g. a carrier reserved for pico cell deployment), or can identify them by PCI. The latter is especially valuable for deployments in which the macro cell and the pico cell share a same frequency. In this case the default procedure for the UE is to differently report on those small cells as compared to those not identified by frequency layer or PCI in system information, and the network can override this default procedure on a per-UE basis by dedicated signaling.

For the case in which block 204 puts the UE 10 in the high mobility state 206, the UE knows to scale its mobility parameters 208 differently for the small cells identified at 202A than for the large cells. For example, the UE scales down the time to trigger TTT parameter at 208A to a relatively shorter value for the larger/macro cells and scales it up to a relatively longer value for the smaller/pico cells. The network may specify the up-scaling for small cells only for fast moving UEs (those in the highest mobility state), and/or as noted above the network may define this downscaling for one or more specific frequency layer or for specifically identified cells (one cell PCI or a range of PCIs). In another example the network may specify down scaling for small cells for slow (normal) moving UEs (those in the lowest mobility state).

This is among the least disruptive ways to implement these teachings in existing wireless systems, in that the current rules for speed scaling would remain applicable but only for large/macro cells which in the FIG. 2 example are those not specifically signaled by the network (or those frequency layers not specifically identified with small/pico cells). In this manner the network 12 can decide whether to use up-scaling, down-scaling or no scaling at all for the cells on a given frequency layer or for individual cells (in case of co-channel small and macro cells deployments) up-scaling, down-scaling or no scaling of TTT should be done by the UE when higher mobility state (High or Medium mobility state) gets triggered.

The same result can be obtained by the network configuring the small/pico cells with different measurement configurations rather than different scaling factors. In both cases the network will identify the small cells by the different measurement and/or reporting parameters themselves.

The remainder of FIG. 2 concerns an embodiment in which the configuration at 202 is for the UE to skip reporting on the neighbor cells which are small/pico cells even though the UE 10 continues to take measurements of them. This is still a high speed UE 10 as tracked at block 204. In this case the UE 10 takes measurements of all detected neighbor cells 212 but evaluates at functional block 214 which ones to report based on cell size (however cell size is identified at 202A). In an exemplary embodiment the measurements made by the fast moving UE 10 (for example, high or medium mobility state) are made with relatively relaxed requirements as compared to if the UE 10 were in a low mobility state. Knowing from 202A which cells are small cells, the UE 10 evaluates at 214 and knows not to send measurement reports on those identified small cells so long as it is high (or either medium or high) speed per block 204. The relaxed requirements for cell measurements when the UE 10 is high speed enables the UE 10 to react faster to changes in the speed detection states at 204 as the cell detection and measurements are performed, and so measurements which are reported are done without delay.

In another embodiment not specifically shown at FIG. 2, the high speed UE 10 is configured to omit even measuring the identified small/pico cells. In this embodiment the UE's lack of performing cell detection or measurements on the identified small/pico cells necessarily results in the UE 10 ignoring reporting on measurements it has never taken, regardless of any time to trigger scaling that might be employed.

One consideration for this embodiment of omitting taking the measurement is that this will introduce a delay in the potential use of those small/pico cells when some actual data transfer starts. Against this minor delay is the improved power efficiency at the UE which on balance likely would favor the UE's power improvement since, unless the signal from the macro eNB is quite weak, the data transfer can continue still on or very near schedule via the macro eNB. To more particularly address the data-transferring UE 10, one variation on this embodiment is that the fast moving UE 10 undergoing an active data transfer will not omit reporting neighbor small/pico cells but the measurement performance requirements for the UE concerning small/pico neighbor cells can be relaxed in order to enable a lower UE activity level. For the case in which the high speed UE 10 has no active data applications ongoing there is no immediate need for any data transmissions and so the UE in that case would omit its reporting of the neighbor small/pico cells.

FIG. 2 detailed embodiments in which the UE 10 was in a RRC connected state with its serving cell/eNB 12. According to certain exemplary embodiments, also an idle mode UE 10 can differentiate its measurement reporting of small/pico versus large/macro neighbor cells. In one embodiment the high speed idle mode UE 10 skips its reselections towards small cells. In this embodiment the UE 10 would still perform the measurements, but by knowing the identified small cells it would know to omit triggering of cell reselections toward them, at least under the condition that the UE 10 is high (or medium) speed. Whether in connected or idle modes, the high/medium mobility state UE 10 can thereby react faster to changes in its speed detection states as the cell detection and measurements are still performed and available already within the UE 10 when for example the UE transitions to a low mobility state, at which time measurement reporting can be done without delay.

Similar to FIG. 2, the high/medium mobility state idle mode UE 10 can also skip taking measurements of the identified small/pico cells. As mentioned above with respect to FIG. 2, this would introduce a bit of a delay when there is an ongoing data transfer, but may be solved similarly as detailed above for the RRC connected UE in that the UE skips taking the measurements only when it has no ongoing data transfer applications running and otherwise continues with its measurements of the small cells (albeit with relaxed performance standards) and also continues its reporting of those small cell measurements.

For the high/medium speed idle mode UE 10 there can also be different rules for measurement and reselection on neighbor small cells as compared to the low speed idle mode UE. As an example, the parameter $T_{reselection}$ may be scaled to be longer for the identified small cells when the idle mode UE is faster moving and down-scaled to be shorter when the idle mode UE is slower moving or when the UE's speed is increasing. In this embodiment the conventional neighbor cell measurement and reporting rules for speed-related scaling would still apply for the larger cells, which are those not identified as being small cells (or alternatively those which are positively identified as being large cells).

The same result may be obtained by configuring the idle mode UE with different re-selection rules or parameters for small cells as compared to large cells, as opposed to different scaling factors.

Combining certain of the above non-limiting embodiments then, for both the idle mode and the RRC connected mode UE, the medium or low speed UE 10 will perform cell detection and measurements to some level but does trigger any reports for the case the cell is one of the identified small cells, and the high speed UE fully omits cell detection and measurements, and consequently measurement reporting for the case of neighbor small cells. The UE, whether fast, medium or slow moving, will detect, measure and report conventionally for the case of neighbor large cells.

Various of the above implementations will provide one or more of the following technical effects. First, they avoid unnecessary re-selection to small cells. Second, they avoid unnecessary measurement reporting and handovers to small cells. As a consequence of those two then also the related signaling is avoided as being unnecessary also. Some embodiments detailed above also avoid unnecessary gaps in an ongoing data transfer that might otherwise occur during a handover to a small cell. In general the embodiments detailed herein reduce the power consumption at the UE due to reduced measurements and/or reporting. There is a real potential to reduce radio link failure since handover to small cells are avoided, and all of the above except perhaps the power consumption savings provide for a more robust UE mobility. All of these are seen to more than offset the added complexity in adopting these teachings.

Figure 3:
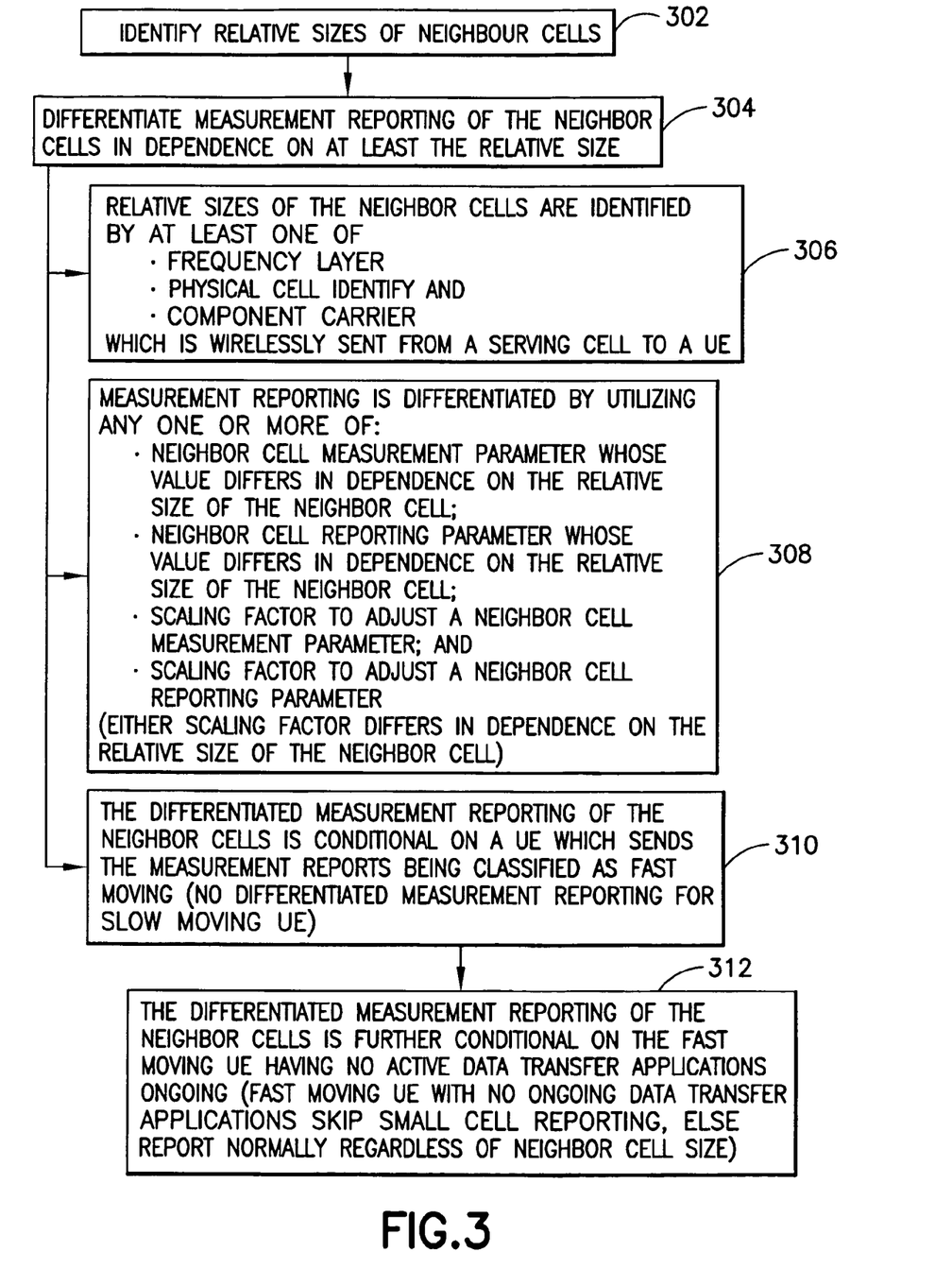
FIG. 3 is a logic flow diagram illustrating the operation of a method, and a result of execution of computer program instructions embodied on a computer readable memory, in accordance with exemplary embodiments of these teachings.

The flow diagram of FIG. 3 illustrates some of the above exemplary, embodiments from the perspective of the UE 10 and of the serving cell/eNB 12. At block 302 there are identified relative sizes of neighbor cells. In the examples the small cells are explicitly identified (frequency layer or PCI) and all the cells not explicitly identified are the large cells. The reverse is also possible in which the large cells are explicitly identified and the small cells are by implication the remaining ones. Or the identification can be implicit, for example the neighbor cell list which the serving cell provides to the UE can include an indication dividing the list between larger cells indicated prior to the divider indication and smaller cells indicated after (or vice versa).

At block 304 the measurement reporting of the neighbor cells is differentiated in dependence on at least the relative size. The differentiation may be in how frequent such measurements and/or reports are made, in whether or not they are made (all other conditions being equal, such as UE mobility state for example), or even in whether or not measurements of the neighbor cells are even taken by the UE.

For the case in which the serving cell/eNB 12 performs block 302 and 304, it identifies the relative sizes of neighbor cells at block 302 via signaling to the UE, such as the RRC configuration signaling shown at FIG. 2, the alternate messages described with respect to FIG. 2, or via system information as alternatively described above. That same serving cell/eNB 12 may differentiate the measurement reporting of the neighbor cells at block 304 by providing to the UE different values for any one or more of neighbor cell measurement parameters neighbor cell reporting parameters and a scaling factor for either as between small and large neighbor cells.

For the case in which the UE 10 performs block 302 and 304, it identifies the relative sizes of neighbor cells at block 302 from signaling received from its serving cell. The UE differentiates the measurement reporting of the neighbor cells at block 304 by utilizing different values for at least one of a neighbor cell measurement parameter and a neighbor cell reporting parameter as between small and large neighbor cells. The values are provided by the serving cell/eNB 12 as above but utilized by the UE 10. For the UE 10, utilizing these different values result in the UE 10 omitting reporting on but not the collecting of neighbor cell measurements for the case the neighbor cell is an identified small neighbor cell; and omitting the detecting and measuring of neighbor cells which are identified to be small neighbor cells. These omissions are as compared to the case in which the neighbor cell is a large cell.

Further portions of FIG. 3 summarize certain of the various non-limiting embodiments and implementations which were detailed above. At block 306 the relative sizes of the neighbor cells are identified by at least one of a frequency layer and/or a physical cell identity and/or a component carrier, any or all of which are wirelessly sent from the serving cell to the UE.

Four specific implementations are shown at block 308 for how the measurement reporting is differentiated, and any one or more of these may be used in a given practical embodiment. There may be utilized at least one or more of: a neighbor cell measurement parameter whose value differs in dependence on the relative size of the neighbor cell; a neighbor cell reporting parameter whose value differs in dependence on the relative size of the neighbor cell; a scaling factor to adjust a neighbor cell measurement parameter; and a scaling factor to adjust a neighbor cell reporting parameter, in which a value of either of those scaling factors differs in dependence on the relative size of the neighbor cell. More particularly, the scaling factor to adjust the neighbor cell measurement parameter may be $T_{reselection}$; and the scaling factor to adjust the neighbor cell reporting parameter may be time to trigger.

Block 310 stipulates as in the above examples that the differentiated measurement reporting of block 304 is conditional on a UE which sends the measurement reports being classified as fast moving (that is, for a UE classified as slow moving there is no differentiated measurement reporting based on neighbor cell size). There are different approaches in various different radio access technologies for classifying UE speed, in the above examples UE mobility state was used but other technologies may use other ways to classify. In different embodiments the medium mobility state may be includes with either the high or the low mobility state, but in either case it will be stipulated whether the medium mobility state does or does not give rise to differentiated measurement reporting based on neighbor cell relative size.

Block 312 gives a further condition in addition to the UE speed at block 310. Specifically, block 312 conditions the differentiated measurement reporting of block 304 further on the fast moving user equipment having no ongoing active data transfer applications. In this context, data transfer refers to wireless data transfer to or from the UE, not merely moving data bits within the UE itself which is essentially always ongoing when the UE is powered up (for example, the UE continually tracks various internal timers). In this embodiment the fast moving UE having no active data transfer applications ongoing will omit its measurement reporting of neighbor cells which are identified to be small neighbor cells, and the fast moving UE having at least one active data transfer application ongoing will report its measurements of neighbor cells normally, regardless of the neighbor cell relative size.

FIG. 3 may be considered to be a logic flow diagram that illustrates the operation of a method, and a result of execution of computer program instructions, in accordance with the exemplary embodiments of this invention, such as for example from the perspective of the UE 10 or of the serving cell/eNB 12. The various blocks shown in FIG. 3 may be viewed as method steps, and/or as operations that result from operation of computer program code, and/or as a plurality of coupled logic circuit elements constructed to carry out the associated function(s).

For example, the UE 10 or the serving cell/eNB 12, or one or more components thereof, can form an apparatus comprising at least one processor and at least one memory including computer program code, in which the at least one memory and the computer program code are configured to, with the at least one processor, cause the apparatus to perform the elements shown at FIG. 3 and/or recited in further detail above.

Figure 4:
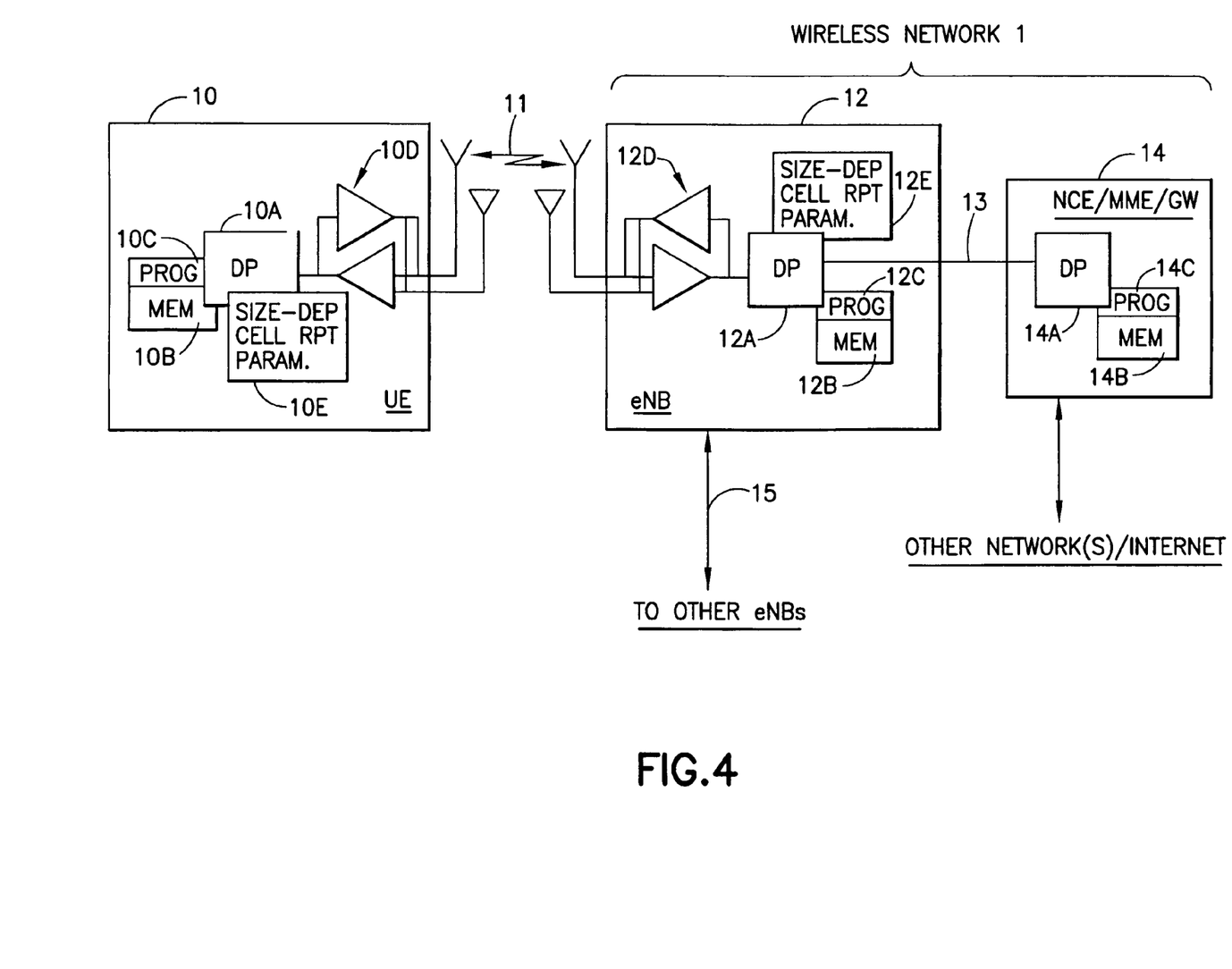
FIG. 4 shows a simplified block diagram of certain apparatus which may be utilized to practice the invention according to certain of the embodiments presented herein.

FIG. 4 illustrates a simplified block diagram of various electronic devices and apparatus that are suitable for use in practicing the exemplary embodiments of this invention. In FIG. 4 a wireless network 1 is adapted for communication over a wireless link 11 with an apparatus, such as a mobile communication device which above is referred to as a UE 10, via a serving network access node which above is referred to as an eNB 12. The network 1 may include a network control element (NCE) 14 that may include the mobility entity/serving gateway MME/S-GW functionality known in the LTE system, and which provides connectivity with another network, such as a telephone network and/or a data communications network (e.g., the internet).

The UE 10 includes a controller, such as a computer or a data processor (DP) 10A, a computer-readable memory medium embodied as a memory (MEM) 10B that stores a program of computer instructions (PROG) 10C, and a suitable radio frequency (RF) transceiver 10D for bidirectional wireless communications with the eNB 12 via one or more antennas. The eNB 12 also includes a controller, such as a computer or a data processor (DP) 12A, a computer-readable memory medium embodied as a memory (MEM) 12B that stores a program of computer instructions (PROG) 12C, and a suitable RF transceiver 12D for communication with the UE 10 via one or more antennas. The eNB 12 is coupled via a data/control path 13 to the NCE 14. The path 13 may be implemented as the S1 interface known in LTE. The eNB 12 may also be coupled to another eNB via data/control path 15, which may be implemented as the X2 interface known in LTE.

At least one of the PROGs 10C and 12C is assumed to include program instructions that, when executed by the associated DP, enable the device to operate in accordance with the exemplary embodiments of this invention, as detailed above.

That is, the exemplary embodiments of this invention may be implemented at least in part by computer software executable by the DP 10A of the UE 10 and/or by the DP 12A of the eNB 12, or by hardware, or by a combination of software and hardware (and firmware).

For the purposes of describing the exemplary embodiments of this invention the UE 10 may be assumed to also include size-dependent cell reporting parameters (and/or scaling factors) shown generally at block 10E, which parameters (and/or scaling factors) are also within the eNB 12 at block 12E since it is the eNB 12 which provides the parameters and/or scaling factors to the UE 10 over the wireless link 11. For the UE the block 10E represents the stored parameters/scaling factors and the algorithm to implement them differentially depending on the cell size; for the eNB that block 12E represents the stored parameters/factors which the eNB 12 sends to the UE 10.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 10B and 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on a multicore processor architecture, as non-limiting examples.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention. Some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. An apparatus comprising: at least one processor; and at least one memory including computer program code, in which the at least one memory and the computer program code are configured, with the at least one processor, to cause the apparatus at least to:
    identify relative sizes of neighbor cells; and
    differentiate measurement reporting by at least one of utilizing at least one neighbor cell measurement parameter whose value differs in dependence on the relative size of the neighbor cell; utilizing at least one neighbor cell reporting parameter whose value differs in dependence on the relative size of the neighbor cell; utilizing at least one scaling factor to adjust a neighbor cell measurement parameter; and utilizing at least one scaling factor to adjust a neighbor cell reporting parameter.

2. The apparatus according to claim 1, in which the relative sizes of the neighbor cells are identified by at least one of frequency layer and physical cell identity and component carrier which is wirelessly sent from a serving cell to a user equipment.

3. The apparatus according to claim 1, wherein a value of the at least one scaling factor differs in dependence on the relative size of the neighbor cell.

4. The apparatus according to claim 3, in which at least one of:
    the at least one scaling factor to adjust the neighbor cell measurement parameter is $T_{reselection}$; and
    the at least one scaling factor to adjust the neighbor cell reporting parameter is time to trigger.

5. The apparatus according to claim 1, in which the differentiated measurement reporting of the neighbor cells is conditional on a user equipment which sends the measurement reports being classified as fast moving.

6. The apparatus according to claim 5, in which the differentiated measurement reporting of the neighbor cells is further conditional on the fast moving user equipment having no active data transfer applications ongoing, such that:
    the fast moving user equipment having no active data transfer applications ongoing omits measurement reporting of neighbor cells which are identified to be small neighbor cells; and
    the fast moving user equipment having at least one active data transfer application ongoing reports measurements of neighbor cells regardless of their relative size.

7. The apparatus according to claim 1, in which the apparatus comprises a user equipment which identifies the relative sizes of neighbor cells from signaling received from a serving cell and which differentiates the measurement reporting of the neighbor cells by utilizing different values for at least one of a neighbor cell measurement parameter, a neighbor cell reporting parameter, and a scaling factor therefore as between small and large neighbor cells.

8. The apparatus according to claim 7, in which the different values result in the apparatus performing at least one of:
   omitting detecting and measuring of neighbor cells which are identified to be small neighbor cells; and
   omitting reporting of measurements that have been collected from neighbor cells which are identified to be small neighbor cells.

9. The apparatus according to claim 1, in which the apparatus comprises a serving cell which identifies the relative sizes of neighbor cells via signaling to a user equipment, and which differentiates the measurement reporting of the neighbor cells by providing to the user equipment different values for at least one of a neighbor cell measurement parameter, a neighbor cell reporting parameter and a scaling factor therefore as between small and large neighbor cells.

10. The apparatus according to claim 1, wherein differentiate measurement reporting comprises determining based on at least the relative size of a neighbor cell whether a measurement of a neighbor cell is to be at least one of taken and reported.

11. A method comprising:
   using a radio communications device, identifying relative sizes of neighbor cells; and
   using the radio communications device, differentiating measurement reporting by at least one of utilizing at least one neighbor cell measurement parameter whose value differs in dependence on the relative size of the neighbor cell; utilizing at least one neighbor cell reporting parameter whose value differs in dependence on the relative size of the neighbor cell; utilizing at least one scaling factor to adjust a neighbor cell measurement parameter; and utilizing at least one scaling factor to adjust a neighbor cell reporting parameter.

12. The method according to claim 11, in which the relative sizes of the neighbor cells are identified by at least one of frequency layer and physical cell identity and component carrier which is wirelessly sent from a serving cell to a user equipment.

13. The method according to claim 11,
   wherein a value of the at least one scaling factor differs in dependence on the relative size of the neighbor cell.

14. The method according to claim 13, in which at least one of:
   the at least one scaling factor to adjust the neighbor cell measurement parameter is $T_{reselection}$; and
   the at least one scaling factor to adjust the neighbor cell reporting parameter is time to trigger.

15. The method according to claim 11, in which the measurement reporting of the neighbor cells is conditional on a user equipment which sends the measurement reports being classified as fast moving.

16. The method according to claim 15, in which the differentiated measurement reporting of the neighbor cells is conditional on the fast moving user equipment having no active data transfer applications ongoing, such that:
   the fast moving user equipment having no active data transfer applications ongoing omits measurement reporting of neighbor cells which are identified to be small neighbor cells; and
   the fast moving user equipment having at least one active data transfer application ongoing reports measurements of neighbor cells regardless of their relative size.

17. The method according to claim 11, in which the method is executed by a user equipment which identifies the relative sizes of neighbor cells from signaling received from a serving cell and which differentiates the measurement reporting of the neighbor cells by utilizing different values for at least one of a neighbor cell measurement parameter, a neighbor cell reporting parameter and a scaling factor therefore as between small and large neighbor cells.

18. The method according to claim 17, in which the different values result in the user equipment performing at least one of:
   omitting detecting and measuring of neighbor cells which are identified to be small neighbor cells; and
   omitting reporting of measurements that have been collected from neighbor cells which are identified to be small neighbor cells.

19. The method according to claim 11, in which the method is executed by a serving cell which identifies the relative sizes of neighbor cells via signaling to a user equipment, and which differentiates the measurement reporting of the neighbor cells by providing to the user equipment different values for at least one of a neighbor cell measurement parameter, a neighbor cell reporting parameter and a scaling factor therefore as between small and large neighbor cells.

20. A non-transitory computer readable memory storing a program of instructions comprising:
   code for identifying relative sizes of neighbor cells; and
   code for differentiating measurement reporting by at least one of utilizing at least one neighbor cell measurement parameter whose value differs in dependence on the relative size of the neighbor cell; utilizing at least one neighbor cell reporting parameter whose value differs in dependence on the relative size of the neighbor cell; utilizing at least one scaling factor to adjust a neighbor cell measurement parameter; and utilizing at least one scaling factor to adjust a neighbor cell reporting parameter.

21. The computer readable memory according to claim 20, in which the code for differentiating the measurement reporting is executed conditional on a user equipment in which sends the measurement reports being classified as fast moving.

* * * * *